United States Patent
Kahn et al.

(10) Patent No.: US 12,096,253 B2
(45) Date of Patent: Sep. 17, 2024

(54) SUPPORT FOR TIME SENSITIVE COMMUNICATIONS WITH HIGH RELIABILITY PROVIDED VIA NETWORK SLICING AND PATH DIVERSITY

(71) Applicant: Nokia Technologies Oy, Espoo (FI)

(72) Inventors: Colin Kahn, Morris Plains, NJ (US); Thomas Theimer, Baierbrunn (DE)

(73) Assignee: Nokia Technologies Oy, Espoo (FI)

( * ) Notice: Subject to any disclaimer, the term of this patent is extended or adjusted under 35 U.S.C. 154(b) by 337 days.

(21) Appl. No.: 17/594,055

(22) PCT Filed: Apr. 5, 2019

(86) PCT No.: PCT/US2019/026147
§ 371 (c)(1),
(2) Date: Sep. 30, 2021

(87) PCT Pub. No.: WO2020/204949
PCT Pub. Date: Oct. 8, 2020

(65) Prior Publication Data
US 2022/0174514 A1 Jun. 2, 2022

(51) Int. Cl.
*H04W 24/04* (2009.01)
*H04L 1/22* (2006.01)
(Continued)

(52) U.S. Cl.
CPC .............. *H04W 24/04* (2013.01); *H04L 1/22* (2013.01); *H04W 48/18* (2013.01); *H04W 76/12* (2018.02); *H04W 76/15* (2018.02); *H04W 80/02* (2013.01)

(58) Field of Classification Search
CPC ..... H04W 24/04; H04W 76/12; H04W 76/15; H04W 48/18; H04L 1/22
(Continued)

(56) References Cited

U.S. PATENT DOCUMENTS

2018/0270744 A1 9/2018 Griot et al.
2018/0368132 A1 12/2018 Babaei et al.
(Continued)

FOREIGN PATENT DOCUMENTS

WO WO-2018228134 A1 12/2018
WO WO-2019130048 A1 7/2019

OTHER PUBLICATIONS

3rd Generation Partnership Project; Technical Specification Group Services and System Aspects; Study on Communication for automation in Vertical Domains; (Release 16), 3GPP TR 22.804 v16.3.0 (Jul. 2020). (197 pages).
(Continued)

*Primary Examiner* — Joel Ajayi
(74) *Attorney, Agent, or Firm* — Mintz Levin Cohn Ferris Glovsky and Popeo, P.C.

(57) ABSTRACT

Methods and apparatus, including computer program products, are provided for reliability network slicing. In some example embodiments, there may be provided a method that includes accessing, by at least one user equipment, a first network reliability slice served by a first base station; accessing, by at least one user equipment, a second network reliability slice served by a second base station, wherein the first network reliability slice and the second network reliability slice are established across domains such that one or more first resources providing the first network reliability slice are not shared with one or more second resources providing the second network reliability slice; establishing, by the at least one user equipment, a first packet data protocol session over the first network reliability slice and a second packet data protocol session over the second network reliability slice; and transmitting, by the at least one user equipment, user plane traffic over the first packet data protocol session on the first network reliability slice and duplicated user plane traffic over the second packet data
(Continued)

protocol session on the second network reliability slice. Related systems, methods, and articles of manufacture are also disclosed.

22 Claims, 7 Drawing Sheets

(51) Int. Cl.
    *H04W 48/18*     (2009.01)
    *H04W 76/12*     (2018.01)
    *H04W 76/15*     (2018.01)
    *H04W 80/02*     (2009.01)

(58) Field of Classification Search
    USPC ...................................................... 455/414.1
    See application file for complete search history.

(56) References Cited

U.S. PATENT DOCUMENTS

2019/0007899 A1    1/2019    Vrzic et al.
2019/0327149 A1   10/2019   Sun et al.

OTHER PUBLICATIONS

3rd Generation Partnership Project; Technical Specification Group Services and System Aspects; Feasibility Study on LAN Support in 5G; (Release 16), 3GPP TR 22.821 v16.1.0 (Jun. 2018). (52 pages).
3rd Generation Partnership Project; Technical Specification Group Services and System Aspects; Study on enhancement of Ultra-Reliable Low-Latency Communication (URLLC) support in the 5G Core network (5GC); (Release 16), 3GPP TR 23.725 v1.0.0 (Sep. 2018). (59 pages).
3rd Generation Partnership Project; Technical Specification Group Services and System Aspects; Service requirements for the 5G system; (Release 17), 3GPP TS 22.2261 v17.3.0 (Jul. 2020). (83 pages).
Borcoci, E. "End-to-end, multi-domain and multi-talent aspects in 5G network slicing," Softnet 2018 Conference, Oct. 14-18, 2018, Nice, France. (123 pages).
Ericsson, "Evaluation of Solution #1: Redundant user plane paths based on dual connectivity," 3GPP TSG-SA WG2 Meeting #129, S2-181140, Dongguan, China, Oct. 15-19, 2018. (8 pages).
Ferr?s, R. et al., "Management of Network Slicing in 5G Radio Access Networks: Functional Framework and Information Models," arXiv:1803.01142. (16 pages).
IEEE 802.1CB-2017—IEEE Standard for Local and metropolitan area networks—Frame Replication and Elimination for Reliability.
International Search Report and Written Opinion issued for PCT/US2019/026147, on Dec. 5, 2019. (19 pages).
Kibria, M.G. et al., "Next Generation New Radio Small Cell Enhancement: Architechtural Options, Functionality and Performance Aspects," arXiv:1802.10267v1 [cs.IT] Feb. 28, 2018. (9 pages).
Nokia, Alcatel "Radio resource isolation requirements," 3GPP TSG-RAN WG2 NR Adhoc, R2-1700078, Spokane, USA, Jan. 17-19, 2017. (2 pages).
Rugeland, P. et al., Architectural enablers and concepts for mm-wave RAN integration, White Paper, 5GPPP mmMAGIC, Mar. 2017. [Online]. Available: https://bscw.5g-mmmagic.eu/pub/bscw.cgi/d187833/ mmMAGIC Architectural enablers mmWave integration.pdf.

SUPPORT FOR TIME SENSITIVE COMMUNICATIONS WITH HIGH RELIABILITY PROVIDED VIA NETWORK SLICING AND PATH DIVERSITY

CROSS REFERENCE TO RELATED APPLICATIONS

This application is a national phase entry of Patent Cooperation Treaty Application No. PCT/US2019/026147 filed Apr. 5, 2019, entitled "SUPPORT FOR TIME SENSITIVE COMMUNICATIONS WITH HIGH RELIABILITY PROVIDED VIA NETWORK SLICING AND PATH DIVERSITY," the disclosure of which is incorporated herein by reference in its entirety.

FIELD

The subject matter described herein relates to time sensitive communications over a cellular wireless system.

BACKGROUND

Time sensitive communications (TSC) may be used to support a variety of applications including applications such as ultra-reliable low-latency communications (URLLC), industrial verticals, and/or the like. In the case of industrial verticals and other mission critical applications, there may be some requirements that are relatively unique, such as certain requirements for low latency, deterministic data transmission, and high reliability, when compared to other 5G cellular services.

SUMMARY

Methods and apparatus, including computer program products, are provided for reliability network slicing.

In some example embodiments, there may be provided a method that includes accessing, by at least one user equipment, a first network reliability slice served by a first base station; accessing, by at least one user equipment, a second network reliability slice served by a second base station, wherein the first network reliability slice and the second network reliability slice are established across domains such that one or more first resources providing the first network reliability slice are not shared with one or more second resources providing the second network reliability slice; establishing, by the at least one user equipment, a first packet data protocol session over the first network reliability slice and a second packet data protocol session over the second network reliability slice; and transmitting, by the at least one user equipment, user plane traffic over the first packet data protocol session on the first network reliability slice and duplicated user plane traffic over the second packet data protocol session on the second network reliability slice.

In some variations, one or more of the features disclosed herein including the following features can optionally be included in any feasible combination. The first one or more resources and the second one or more resources each may include components and/or network functions. The domains may include a radio access network, a backhaul transport network, a core network, and/or a data network. The first network reliability slice and the second reliability slice may not share resources in any of the domains. The first network reliability slice and the second reliability slice may minimize shared resources in one or more of the domains. The first network reliability slice may be identified by a first tag that is mapped to one or more domain specific identifiers indicating the first resources used in each of the domains for the first network reliability slice, and the second network reliability slice may be identified by a second tag that is mapped to one or more domain specific identifiers indicating the second resources used in each of the domains for the second network reliability slice. The domain specific identifiers may be a single network slice selection assistance information, a subnetwork identifier, a dedicated reliability tag, a private network identifier, and/or a frequency band. The first network reliability slice and the second network reliability slice may be configured by a management and orchestration function to minimize common physical resource usage between the first network reliability slice and the second network reliability slice. The at least one user equipment may receive a first tag indicating the first network reliability slice is served by the first base station, wherein the first tag is received via a broadcast from the first base station, and the at least one user equipment may receive a second tag indicating the second network reliability slice is served by the second base station, wherein the second tag is received via a broadcast from the second base station. The at least one user equipment may include a first user equipment and a second user equipment, wherein the first user equipment accesses the first network reliability slice and the second user equipment accesses the second network reliability. The at least one user equipment may be in dual connectivity with the first network reliability slice served by the first base station and the second network reliability slice served by the second base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Support for some industrial verticals including industrial automation and mission critical applications for example may require a network reliability that is greater than can be attained using a single user plane path in a network such as the 5G network. For example, failure recovery may introduce transient outages that disrupt traffic flows, and the associated delayed packet retransmission (which occurs after failure recovery) may not be sufficient to meet stringent reliability requirements. Furthermore, connectivity and network function failures in the 5G system's (5GS) control plane may cause disruptions that interfere with a user equipment (UE) registering, updating its registration area, requesting service, and/or being reachable by network applications.

Some use cases that require high reliability have been studied in 3GPP SA1 and documented in TR 22.804 "Study on Communication for Automation in Vertical Domains" and TR 22.821 "Feasibility Study on LAN Support in 5G." For many use cases, high reliability service is coupled with low latency, although the 3GPP study item considered these separate key issues. The coupling is reflected in 5G Service requirements in 3GPP TS 22.261, which drove the system architecture study by 3GPP SA2, which recently completed 3GPP TR 23.725, "Study on enhancement of Ultra-Reliable Low-Latency Communication (URLLC) support in the 5G Core network." In SA2, support for high reliability has apparently focused on providing redundant transmissions in the user plane. This includes support for multiple tunnels for redundant data transmission on the N3 interface and the N9 interface, handover for protocol data unit (PDU) sessions using redundant transmission, transport layer redundancy, and packet replication. The possible solutions include establishment of redundant paths based on 3GPP dual connectivity and multiple PDU sessions (so a device such as a UE would be multi-homed); redundant paths only in the radio access network, or RAN (with a single user plane function (UPF) and UE); redundant N3 tunnels using disjoint transport layer paths (which may provide improved backhaul reliability); and a replication framework for duplicating packets within the 5G system (5GS).

In the radio access network (RAN), 3GPP has standardized packet duplication at the packet data convergence protocol (PDCP) layer (see 3GPP TS 38.300, section 16.1.3). This is supposed to support 5G ultra-reliable low latency communications (URLLC) services by reducing latency and providing two independent transmission paths between the RAN and UE. The packet duplication is configured by radio resource control (RRC). Moreover, the packet duplication may be used with carrier aggregation, for which there is a single media access control layer, or with dual connectivity, for which independent media access control layers are used in the master gNB (MgNB) and the secondary gNB (SgNB). The PDCP layer's packet duplication increases reliability of the air-interface transmission. Moreover, the PDCP layer's packet duplication may be particularly useful at millimeter wavelengths over which radio propagation can be less reliable, when compared to lower frequencies. The dual connectivity option may rely in part on a "Split Bearer" configuration configured to duplicate PDCP layer packet forwarding between the master base station and the secondary base station via an Xn tunnel. However, this may not provide gNB redundancy as both paths share the PDCP layer, and the duplication is configured by the RRC in the node where the PDCP resides. Furthermore, the PDCP layer duplication does nothing to improve reliability in the core network control or user plane. Nor does it provide control plane redundancy outside of that normally provided in a service-based architecture in which recovery actions may cause transient service interruptions; mechanisms to ensure that redundant paths have no or minimal common (e.g., shared) network functions to enable independent failure modes; and provide cross-domain reliability including for the backhaul transport domain and the data network to which the 5GS provides access.

In some example embodiments, there may be provided "reliability network slices." In some example embodiments, at least two reliability network slices support a single end-to-end, high reliability service. The reliability network slice may, in some implementations, increase 5GS service reliability by providing redundant slices having little if any shared network resources, such as within the RAN, transport backhaul, 5G core network, data network, and/or other technology domains between the end stations using the at least two reliability network slices for the single end-to-end, high reliability service. Moreover, the "at least two reliability network slices" may be configured with a QoS to satisfy the requirements of URLLC, TSC, and/or other services.

In some example embodiments, reliability network slices may provide, for end-to-end service, redundant user plane connections, and/or redundant 5GS control planes. Management and orchestration (M&O) may instantiate, configure, define, and/or deploy the at least two reliability network slices to provide separate, independent failure modes. For example, the network functions (or other components in the system) that are part of a first reliability network slice may be separate from (e.g., not shared on in common with) the network functions (or other components in the system) in the second reliability network slice. In this way, these two reliability network slices (which provide a single end-to-end, high reliability service) have independent failure modes—avoiding the sharing of common functions, infrastructure, and transport.

Figure 1:
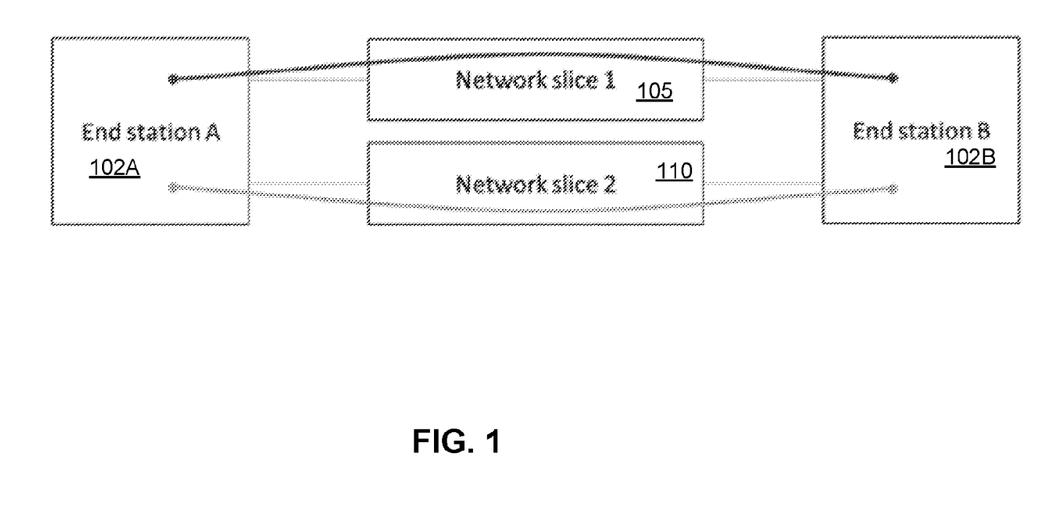
FIG. 1 depicts an example of a system including two reliability network slices, in accordance with some example embodiments.

FIG. 1 depicts an example of at least at least two reliability network slices 105 and 110 configured to support a single end-to-end, high reliability service between two end stations 102A-B, such as a user equipment, IoT device, and/or other types of wireless devices. Each of the reliability network slices 102A-B are instantiated, configured, defined, and/or deployed, so that the reliability network slices 105 and 110 do not share some if not all resources. To that end, each of the reliability network slices 105 and 110 traverses separate resources, such as gNB base stations, backhaul transport switches, network functions, data network components, and the like. This approach deviates from the typical use of network slicing in a variety of ways. For example, typical network slices (not configured as reliability network slices) would purposefully share a common set of network resources, such as network functions, base stations, backhaul transport switches, etc.

In the example of FIG. 1, the reliability network slices provide resource separation to help ensure that the two reliability network slices 105 and 110 do not share resources, such as gNB base stations, network functions, backhaul transport switches, and the like. And, the at least two reliability network slices 105 and 110 thus provide redundant user plane and/or control plane paths end-to-end via the at least two reliability network slices between end stations, such as end stations 102A-B.

In some example embodiments, the M&O may instantiate, configure, define, and/or deploy the two reliability network slice 105 and 110 across different domains, such as the radio access network, backhaul transport, 5G core network, data network, and the like, although other network functions or services may instantiate, configure, define, and/or deploy the reliability network slices as well.

The RAN network functions and 5G core network functions may be established to provide connectivity to a data network via at least two reliability network slices. This may be established based on for example an operator input. For example, operator input may request establishment of two or more reliability slices using a service orchestration function that specifies service reliability requirements, the level of redundancy, and configuration options for the RAN and 5G Core and other network domains. For example, the RAN resources such as the gNB and the core network functions, such as the SMF and the like, included in a first reliability network slice are configured to have independent failure modes, so that if a network function for example in the first reliability network slice 105 fails it does not affect the second reliability network slices 110. This independent failure mode may be statistically independent to the degree needed to meet reliability requirements, which may be specified by the operator. For example, the degree of resource separation between the two reliability network slices may vary based on the reliability requirements. To illustrate further, a first application or service may only need the first and second reliability network slices to be separate in the RAN and 5G core system in order to meet the QoS requirement for reliability. However, a second application or service may need the first and second reliability network slices to be separate at the UE, RAN, transport backhaul, and data network in order to meet the QoS requirement for reliability. As such, independent failure modes may be implemented by decreasing or minimizing shared network function instances, components, and/or shared infrastructure including the transport layer. In some example embodiments, the M&O selects the degree of separation between the first and second reliability network slices based on QoS policy.

In some example embodiments, each of the reliability network slices, such as reliability network slice 105 and 110, may be associated with an identifier, such as a tag. In some example embodiment, the tag is mapped to the reliability network slice's single network slice selection assistance information (S-NSSAI). The S-NSSAI is comprised of a Slice/Service type (SST) and a Slice Differentiator (SD). The SST refers to the slice behavior in terms of features and services such as URLLC and enhanced mobile broadband (eMBB). The optional SD differentiates among multiple network slices of the same SST (e.g., to support separate eMBB slices for different commercial tenants).

Moreover, the tag may be a unique tag that enables identifying a given reliability network slice across domains. For example, the reliability network slices 105 and 110 may span across multiple domains, such as a 5G RAN, backhaul transport, the 5G core system, and/or data networks, each of which may have its own resource management and orchestration system. Furthermore, the tag may also span infrastructure aspects, such as compute resources, cable ducts, cooling, power supplies, and/or other elements that can fail. The tag for a given reliability network slice may span across these domains, so that an M&O can verify or ensure that resources in different reliability network slices (e.g., reliability network slices 105 and 110) are not shared or separate in each domain. For example, a first reliability network slice tag may be assigned to the first reliability network slice 105 and a second reliability network slice tag may be assigned to the second reliability network slice 110.

In some example embodiments, the resources within each domain may be assigned an identifier, such as an S-NSSAI, a virtual local area network tag (e.g., an identifier of a virtual local area network as for example defined by IEEE 802.1Q for Ethernet frames), a private network ID, a subnetwork ID, and/or the like, and these different identifiers in each domain may all be mapped to a given reliability network slice tag(s). In the 5GS domain for example, each network function instance with independent failure modes may be associated with (e.g., mapped to) an S-NSSAI, which is subsequently associated with the reliability slice tag unique to that reliability network slice, while in the transport network a sub-network identifier may be associated with network functions with independent failure modes which are also subsequently mapped to the reliability slice tag unique to that reliability network slice. To illustrate further, resources at the gNB base station, transport backhaul, network functions, 5G core network, and/or data network allocated to the first reliability network slice 105 may use a first set instance of domain specific identifiers to identify reliability slice components to be mapped to the first reliability network slice tag. Likewise, resources at the gNB base station, transport backhaul, network functions, 5G core network, and/or data network allocated to the second reliability network slice 110 may be may use a second set instance of domain specific identifiers to identify reliability slice components mapped to the second reliability network slice tag. As such, the M&O function can ensure that the resources between the first and second network slices 105 and 110 are not shared based on the tags.

Although the previous example assumes no shared resources in any of the domains, some of the resources in a given domain may not be kept separate if not needed to achieve reliability requirements.

Within the 5G system, examples of the reliability network slice tags include: a network slice instance identifier (NSI-ID) as described in 3GPP TS 23.501, the S-NSSAI of the reliability network slice, a private network ID, or subnetwork ID, a network slice-associated frequency band (e.g., a frequency band at a gNB providing access to a network slice) known to the UEs, or another attribute that identifies that the resources in each domain that belong to a reliability network slice.

In some example embodiments, end-to-end service between two user equipment or end stations (which may include time sensitive communication circuitry in accordance with IEEE is provided using at least two reliability network slices to provide a single, end-to-end high-reliability service. Each of these reliability network slices may be identified by its tag, which may be an S-NSSAI. As noted, the UEs may comprise end stations each including circuitry to transmit (e.g., in the case of a "talker") and/or receive (e.g., in the case of a "listener") using for example, Time Sensitive Network (TSN) circuitry that enables communications over a local area time sensitive network on one interface, while also including, or coupling to, user equipment circuitry to enable transmission and/or reception to a 5G network. The TSN circuitry may be in accordance with the IEEE suite of 802.1 series of standards. As noted, the UEs may comprise end stations each including circuitry to transmit (e.g., in the case of a "talker") and/or receive (e.g., in the case of a "listener") using for example, Time Sensitive Network (TSN) circuitry that enables communications over a local area time sensitive network on one interface, while also including, or coupling to, user equipment circuitry to enable transmission and/or reception over another interface to a 5G network. The TSN circuitry may be in accordance with the IEEE suite of 802.1 series of standards. As used herein, network slicing refers to a form of virtualization that allows multiple logical networks to run on top of a shared physical network infrastructure, and this network slicing may be in accordance with the 3GPP TS 28.801, Study on Management and Orchestration of Network Slicing for Next Generation Network, and subsequent Management and Orchestration specifications in the 3GPP 28.5xx series specifications. While reliability network slicing refers to the use of two, end-to-end network slices that share little to no physical resources in order carry duplicate packets end-to-end to enable enhanced reliability. Moreover, the network reliability slices may be configured with QoS to provide URLLC in order to satisfy the demands of TSNs.

Figure 2:
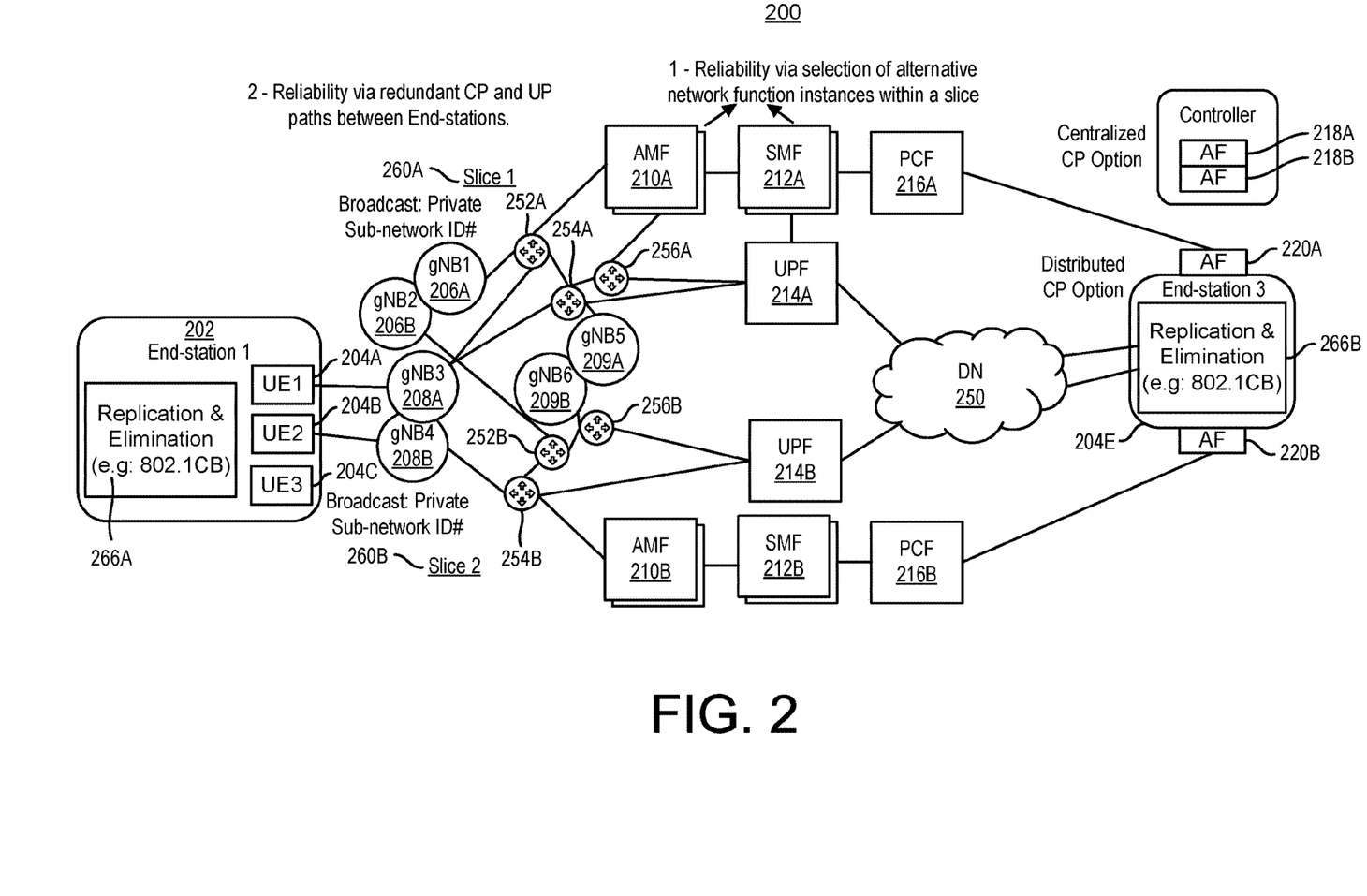
FIG. 2 depicts an example of a portion of the 5G system including two reliability network slices, in accordance with some example embodiments.

FIG. 2 depicts a system 200, in accordance with some example embodiments. The system 200 includes an end station 202 coupled, via at least two reliability network slices 260A and 260B to another end station 204E over different domains, such as a 5G radio access network (e.g., the gNBs), backhaul transport switches/routers, separate bridges or routers, the 5G core network (e.g., the network functions, such as AMF, etc.), and/or a data network 250, such as the Internet or an enterprise data network. In the example of FIG. 2, the two reliability network slices 260A-B provide complete user plane and control plane redundancy end-to-end between the end station 202 and end station 204E.

In the example of FIG. 2, the end station 202 includes one or more UEs, such as UEs 204A-C. Each of the UEs 204A-B are associated with separate reliability network slices. For example, the UE 204A accesses the first network slice 260A for end-to-end, high reliability transport to end station 204E including application function 220A. The first reliability network slice 260A includes gNB base stations 206A, 208A, and 209A, backhaul switches 252A, 254A, and 256A, access management function (AMF) 210A, session management function (SMF) 212A, user plane function (UPF) 214A, policy control function (PCF) 216A, data network 250, and application function (AF) 218A and/or application function 220A. The second reliability network slice 260B includes gNB 206B, 208B, and 209B, backhaul switches 252B, 254B, and 256B, AMF 210B, SMF 212B, UPF 214B, PCF 216B, data network 250, and AF 218B, and/or AF 220B.

For example, UE's 204A first network slice 260A is in the gNB 208A, while the second reliability network slice 260B is in the gNB 208B. The other base gNB base stations 206A-B and 209A-B may be used for mobility. While switches 252A, 254A, and 256A in the first reliability slice and 252B, 254B, and 256B in the second reliability slice are shown in the backhaul network, the reliability slices may be comprised of similar bridges in other parts of the network, such as data network 250. For example, in data network 250 reliability slices may be comprised of separate switches with independent failure modes for the first reliability slice and the second reliability slice.

As noted, the M&O may instantiate, configure, define, and/or deploy the at least two reliability network slices to provide separate, independent failure modes. For example, the M&O may handle the establishment of the at least two reliability network slices in each of the domains. For example, the M&O may instantiate, configure, define, and/or deploy the first reliability network slice 260A in each domain, such as the RAN (e.g., gNBs), backhaul (e.g., switches/routers 252A, and 254A), 5G core (e.g., instantiating the network functions 210A-214A), and data network 250 (e.g., paths through the Internet or other type of data network). And, the M&O may instantiate, configure, define, and/or deploy the second reliability network slice 260B in each domain, such as the RAN (e.g., gNBs), backhaul (e.g., switches/routers 252B, 254B, and 256B), 5G core (e.g., instantiating the network functions 210B-214B), and data network 250. Moreover, the M&O may, based on the identifiers for each of the slices, instantiate, configure, define, and/or deploy the at least two reliability network slices, so that the resources in each domain are separated (e.g., with little if not any sharing). The reliability network slices may, as noted, be across domains and, as such, may support a variety of protocols such as IP and Ethernet in addition to the 5G protocols to provide the end-to-end service.

In some example embodiments, each of the gNB's may broadcast or transmit to the UEs an identifier indicative of the presence of reliability network slices. For example, gNB1 206A may broadcast to the UEs 204A-C a private sub-network ID indicative of the presence of the first network slice 260A at the gNB1, although other types of identifiers may be transmitted as well. Each of the UEs may then determine the slice-specific gNB using different reliability network slice identifiers. For example, the UE 204A may detect the identifier (which was broadcast or transmitted) for the first reliability network slice 260A at gNB3 208A, and then register and establish a PDU session over that first network slice 260A. Likewise, the UE 204A may receive the identifier (which was broadcast or transmitted) for the second reliability network slice 260B at gNB4 208B, and then register and establish a PDU session over that second network slice 260B.

In some example embodiments, each 5G base station, such as a gNB, may be configured to belong to (or be a part of) a private network, which makes available a given reliability network slice. Moreover, the gNB may, as noted, transmit or broadcast one or more identifiers to the UEs. The identifiers allow the UEs (even before accessing a given gNB base station) to detect the presence of the reliability network slices. For example, the gNB may transmit for a given reliability network slice: the NSI-ID, the S-NSSAI of the reliability network slice, a private network ID, a sub-network ID, a network slice-associated frequency band known to the UEs, or other types of attributes that identify that the resources (e.g., the gNBs, network functions, and the like) that belong to a given reliability network slice. A single gNB may be internally sliced (supporting more than one reliability slice S-NSSAI) or separate gNBs may be used for each slice. If separate gNBs are used, the radio coverage of the reliability network slices may be the same or similar.

In some example embodiments, one or more UEs at an end station may be provisioned by the M&O with S-NSSAIs for the at least two reliability network slices. Additionally or alternatively, at least two UEs (e.g., associated with an end station) may be provisioned with the S-NSSAIs of different reliability network slices. In some example embodiments, the M&O may configure a UE to operate using the at least two reliability network slices by, for example, providing the identifiers of the slices and restricting handover between gNBs that do not belong to the same slice. For example, a UE accessing a first reliability network slice at a first gNB, will be allowed to handover to another gNB supporting the same first reliability network slice, but not be allowed to handover to another gNB supporting a second reliability network slice for the end-to-end path. Likewise, cell selection and reselection from RRC-idle and RRC-inactive may also be restricted to gNBs within a single reliability slice.

The network functions, such as the AMF, SMF, UPF, PCF, AF, and/or other network functions may be provided as virtualized network functions. The virtualized network function refers to a network function instantiated and run on one or more virtual machines on top of the hardware networking infrastructure. A virtualized network function (VNF) or service instance may be selected dynamically for a given reliability network slice. For example, if an SMF instance serving a UE fails, an alternative virtual SMF instance may be instantiated and selected to handle subsequent UE transactions. Moreover, when a failure occurs in a first reliability network slice, the service may continue uninterrupted in a second reliability network slice while recovery occurs in the first reliability slice. In some example embodiments, the M&O handles the instantiation, configuration, definition, and/or deployment of the virtualized network functions for the at least two reliability network slices.

For redundant transmission, the packets may be replicated for transmission at an end station or end station talker. For example, the end station 202 may include radio circuitry to transmit (e.g., in the case of a "talker") and/or receive (e.g., in the case of a "listener"). The end station may include, or be coupled to, a user equipment to enable transmission and/or reception to a 5G network as shown. Alternatively or additionally, an end station may include an interface to a wired IEEE Time Sensitive Network as well. For example, the end station 202 may include time sensitive communications circuitry 266 to enable taking and/or listening to devices, such as the robot controller or other types of devices requiring low latency and high reliability. The IEEE provides a suite of Time Sensitive Network (TSN) specifications to allow synchronization of bridges to grand master clocks (see, e.g., IEEE-1588 and IEEE 802.1AS), link layer bridge discovery (IEEE 802.1AB), provisioning of streams including gate scheduling along the path between TSN endpoints (IEEE 802.1Qcc and IEEE 802.1Qbv), frame replication for reliability (IEEE 802.1CB), and other protocols to enable isochronous transmission to connect endpoints across Ethernet bridges. In the example of FIG. 2, the end station may be coupled via the TSN Ethernet to other devices, such as a controller, such as an industrial controller for a robot and/or the like, while the end station access the at least two reliability network slices for high-reliability, low delay, and/or low latency end-to-end path to the end station 204E.

As noted, packet duplication may be provided, in which case the duplicated packets may be eliminated at the end station listener 266B. This duplication may be eliminated in accordance with IEEE 802.1CB. The replication and elimination may occur within an end-station or in the data network to which the 5GS is connected. Alternatively or additionally, the duplication and elimination may reside at other nodes along the reliability slices as well.

The reliability network slices may have the same or similar (e.g., matching) radio coverage provided by separate gNB base stations. And, the reliability network slices may have independent transport layer switches for backhaul from the gNBs as shown at FIG. 2, where the first reliability network slice 260A includes switches 252A, 254A, and 256A and the second reliability network slice 260B includes switches 252B, 254B, and 256B. Alternatively or additionally, a gNB base station may split its distributed unit (DU)/central unit, wherein the central unit may be instantiated in dual connectivity and the transport layer carries F1 interface traffic.

In some example embodiments, an application function, such as AF 218A/B or 220A/B may request a given QoS for each reliability network slice. For example, the AF 220A/B may request that the M&O provide the first reliability network slice 260A with a given level of delay, latency, and/or reliability. This QoS may be in accordance with a policy sufficient to provide an end-to-end service, such as the time sensitive network QoS requirements, and the like.

Figure 3:
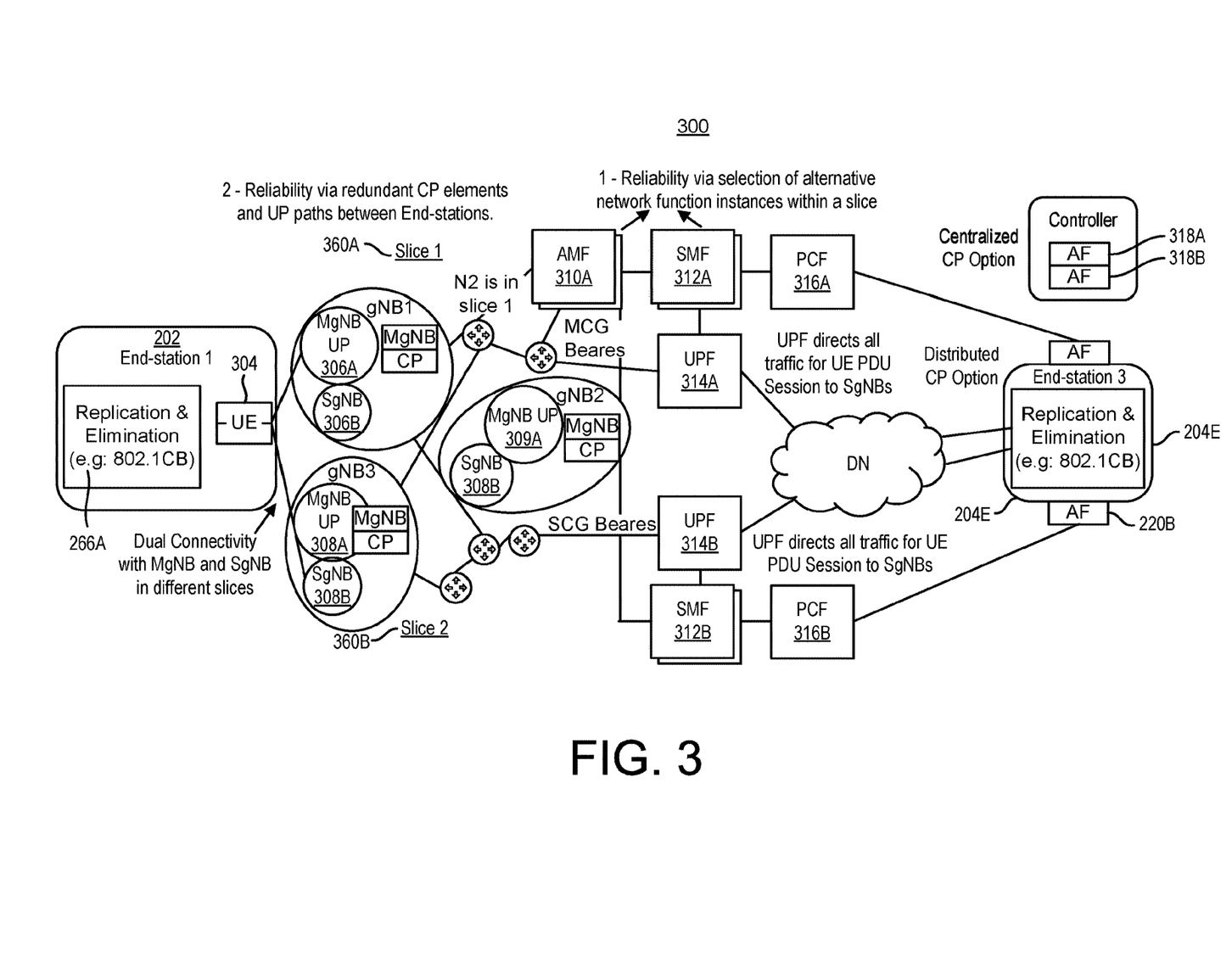
FIG. 3 depicts another example of a portion of the 5G system including two reliability network slices over dual connectivity, in accordance with some example embodiments.

FIG. 3 shows an example of a system 300, in accordance with some example embodiments. The system 300 is similar to system 200 but includes at least two network reliability slices carried via dual connectivity. Specifically, the end stations 302 includes only one UE configured for two reliability network slices 360A-B carried between the UE 304 and RAN via dual connectivity.

In some example embodiments, for an end-point with one UE 304, the MgNB 306A may carry a first reliability network slice 360A including user plane and control plane traffic, while the SgNB 306B may carry a second reliability network slice 360B. Within a private network, the UE may select a gNB (MgNB 306A) that is associated with the reliability network slice for which the UE has an S-NSSAI (which may have been provisioned by the M&O). The UE registers, requests an NSSAI (comprising all the reliability network slices associated with the UE's S-NSSAI), and then establishes a PDU session for the selected reliability network slice. The RAN may be provided the NSSAI of the UE.

In the RAN, dual connectivity may be established using at least one other gNB (SgNB 306B) that supports at least one other reliability network slice in the NSSAI. For example, the MgNB 306A may select a SgNB 306B according to gNB's network slice information. The M&O may instantiate and configure the reliability network slice designations, which in this case a given gNB can belong to the first reliability network slice 360A, the second network reliability slice 360B, or both. Once configured by the M&O, the path may still be chosen dynamically so long as network reliability slice separation is maintained. In this example, the MgNB (which knows its own reliability network slice 360A for the UE) must pick a SgNB with a different reliability network slice 360B. For each additional reliability network slice for which dual connective has been setup, the UE may set up a separate PDU session via signaling through the MgNB to the 5G core (both MgNB control plane and AMF are shared between slices). For the additional PDU sessions, traffic is directed from the reliability network slice-specific UPF to the SgNB for that slice.

To illustrate further, a PDU session is setup through the MgNB. All QoS flows go through the MgNB. The UE may report signal strengths of other gNBs. The MgNB determines that another gNB may be used as a SgNB and initiates RRC reconfiguration (signaling with the UE) to setup the UE on the SgNB. For the secondary cell group bearer dual connectivity, the UPF is instructed to forward some QoS flows directly to the SgNB. Alternatively, the MgNB may determine that another gNB is in a different reliability slice supported by the UE, and that it may be used as a SgNB and initiates RRC reconfiguration to setup the UE on the SgNB. The UE may establish a new PDU session on the SgNB. The SMF and UPF in the new reliability slice may be selected so we can have separate UPFs and SMFs for each reliability slice, as depicted in FIG. 3.

In the example of FIG. 3, the master gNB's 306A user plane and the secondary gNB's 306B user plane are in different reliability network slices 360A-B. And, these different user planes are configured with a master cell group (MCG) bearer and a secondary cell group (SCG) bearer (rather than split bearers in accordance with 3GPP TS 37.340). As such, the user plane traffic associated with a PDU session that terminates in first network slice's user plane function (UPF) 314A is directed by the SMF 312A to the MgNB 306A. Likewise, the user plane traffic associated with a PDU session that terminates in the second network slice's UPF 314B is sent by SMF 312B to the SgNB 306B. If for any reason a SgNB is not available, the second network slice's UPF 314B is configured by the SMF 312B to block traffic for that PDU session.

In operation, the UE 304 may select a master gNB, such as MgNB 306A, registers, and sets up PDU sessions for the first network reliability slice 360A. Based on RRC measurements from the UE 304, the MgNB 306A may add, as part of dual connectivity, a SgNB, such as SgNB 306B (see, e.g., 3GPP TS 37.340 section 10.2 Secondary Node Addition procedure). In the process of adding a SgNB, the MgNB may select only those gNBs that support a different network reliability slice from the network reliability slice used by the MgNB. The UE may then set up the second reliability network slice's PDU session. In this way, two reliability network slices 360A-B are established via dual connectivity.

In the example of FIG. 3, the two network reliability slices 360A-B are partially separate as there is only one UE 304 at the end station 302, so the reliability may be lower than the example of FIG. 2 where a plurality of UEs are implemented. Moreover, FIG. 3 shows that the AMF 310A/B is shared between the two network reliability slices 360A-B, and only the MgNB 306A/308A has a control plane (CP) connection to the 5G core network, so that connection is also shared by the two network reliability slices 360A-B. As such, if the MgNB fails, an established user plane path through the SgNB may be maintained, but some functions that require signaling with 5G core may be disabled. These functions may include PDU session setup, setup of bearers to the UPF, and inter-gNB handover. If the AMF fails, an established user plane path through the SgNB may be maintained but all control plane functions that require the 5G core may be lost until the AMF failure has been recovered (although this recovery may be relatively instantaneous if the AMF is stateless, an AMF set concept is used and the UE context is kept in user data management, UDM). And if there is a connectivity failure on the Xn interface (between MgNB and SgNB), the RRC signaling through the MgNB may be interrupted, which may affect functions that require the 5G core, or NGC. Moreover, if there is a connectivity failure on the N2 interface to the AMF, control plane functions that require the 5G core/NGC may be lost. And if the UE 304 fails, all connectivity is lost. These limitations will apply until the UE can re-establish an RRC connection with an MgNB, Xn, or N2 connectivity is reestablished, or AMF service recovers, as applicable for the failure scenario. Of course, there are established procedures for recovery (e.g., upon detecting radio link failure on the MgNB, RRC connection re-establishment is initiated by the UE (see TS 37.340, section 7.7), and if an AMF fails, the gNB may select a new one from the AMF set (see TS 23.501, section 5.21.2.3). These procedures make outages, in most cases, a transient event that does not affect the end-end service so long as at least one alternative user plane path can be maintained.

Figure 4:
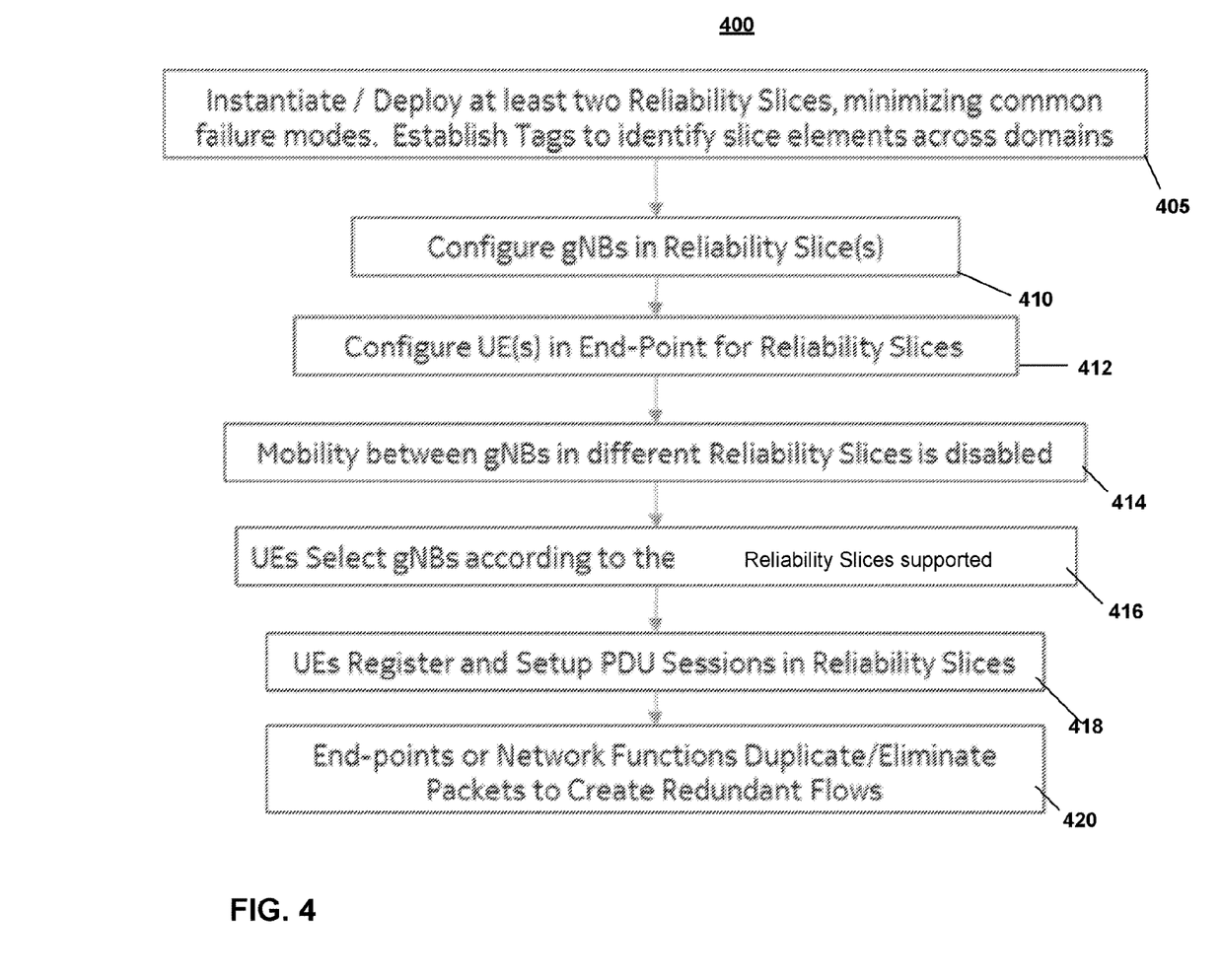
FIG. 4 depict an example of a process for instantiating two reliability network slices, in accordance with some example embodiments.

FIG. 4 depicts an example of a process 400, in accordance with some example embodiments.

At 405, at least two reliability network slices may be instantiated, defined, configured, and/or deployed, in accordance with some example embodiments. For example, each of the network reliability slices may be instantiated across various domains, such as the RAN, backhaul, 5G core, data network, and the like. In the case of multiple domains, the M&O may manage the orchestration, by at least tracking which components and/or network functions support each of the reliability network slices to ensure the independent, separation of the components/network functions being used by each of the slices.

At 410, the gNBs are configured in the reliability network slices. For example, the M&O may configure each of the gNBs, such as 206A, 206B, 306A, and so forth with their corresponding reliability network slice.

At 412, the UEs are configured for reliability network slices. For example, the M&O may configure each of the UEs, such as UE 204A, 204B, 304, and so forth with their corresponding reliability network slice. As noted, the M&O may provide to the UEs the identification for each of the at least two network reliability slices. Moreover, the M&O may, as noted, configure the RAN to avoid handover of a UE to another gNB unless the proper network reliability slice is present.

In some example embodiments, the M&O may disable, at 414, mobility aspect of mobility for the UE. For example, the M&O may disable mobility between the first reliability network slice at the gNB3 208A and the second reliability network slice at the gNB4 208B, which are both part of the same, end-to-end, high reliability path between end stations.

At 416, the UEs may select gNBs according to the network reliability slices supported. For example, UE 204A may be configured with the identifier that is associated with the first reliability network slice 260A and the second reliability network slice 260B. In this way, the UE 204A can determine which gNBs support each of the slices 260A-B in order to access the proper gNBs, which in this example would be 208A and 208B.

At 418, the UE registers and sets up PDU sessions in the reliability network slices. After the UE access the gNB, the UE may register and perform a PDU session establishment via each of the first reliability network slice 260A and the second reliability network slice 260B.

At 420, the end points or network function duplicate and/or eliminate packets to create redundant flows. As noted, the end stations 202 and 204E may include circuitry 266A-B to replicate packets and/or delete duplicate packets.

Figure 5:
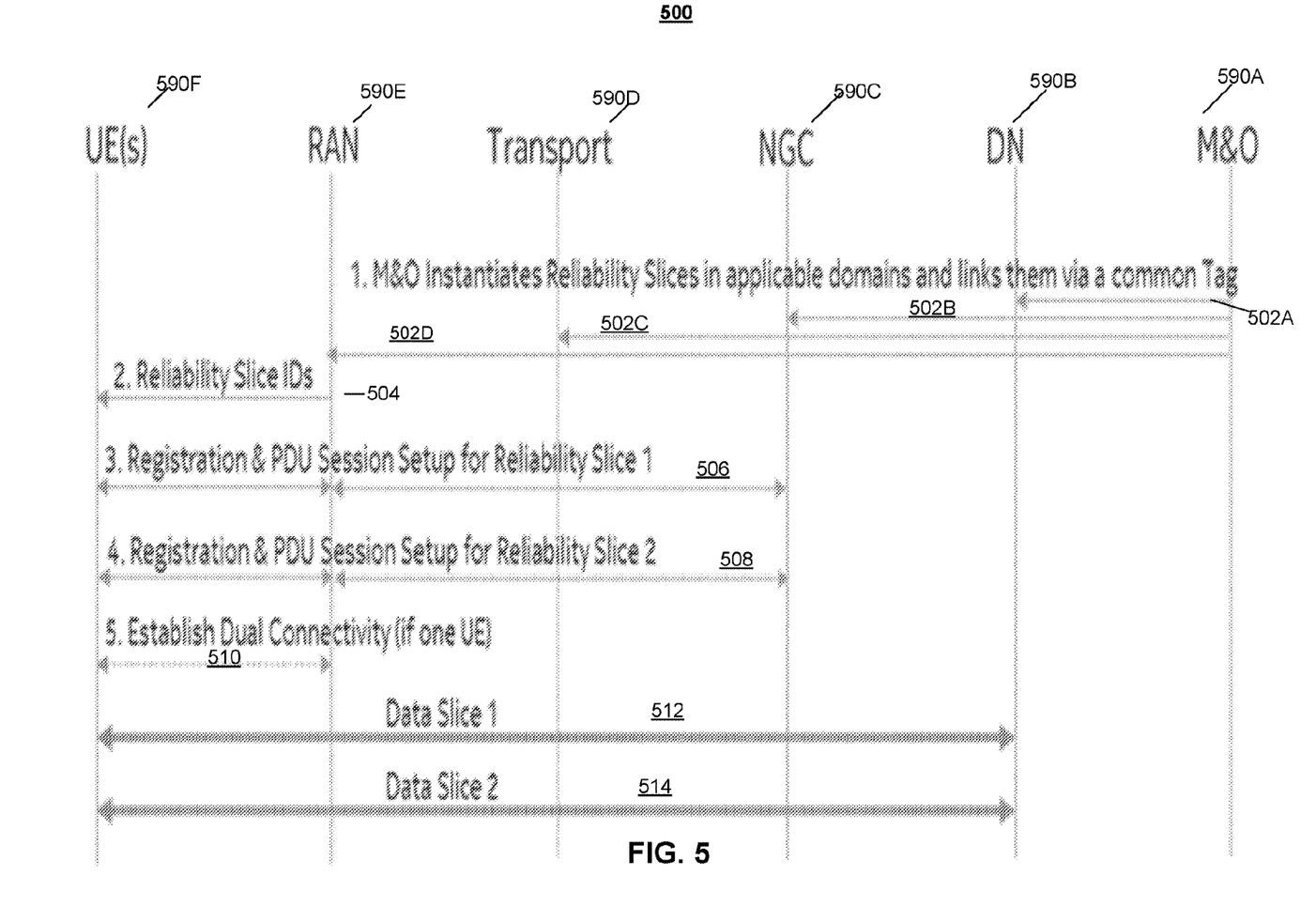
FIG. 5 depict another example of a process for instantiating two reliability network slices, in accordance with some example embodiments.

FIG. 5 depicts an example of a signaling diagram 500, in accordance with some example embodiments. The diagram depicts a UE 590F, a RAN 590E, backhaul transport 590D (e.g., between the gNBs and 5G core network), a core network 590C such as a 5G core, a data network 590B (e.g., data network 200 or 300), and M&O 590A.

A node or function in the 5G system may provide a management and orchestration (M&O) function 590A. At 502A-D, the M&O 590A may instantiate, configure, define, and/or deploy the at least two reliability network slices to provide separate, independent failure modes for an end-to-end service between end stations. As noted, the reliability network slices may span across domains, such as the RAN 590E, backhaul transport 590D, the core network 590C, and/or the data network 590B. When this is the case, the M&O 590A may verify, based on a tag or other identifier for the slices 260A-B, whether the first network reliability slice 260A and the second reliability network slice 260B operate over separate components and/or network function in each domain. For example, the M&O 590A may use given domain identifiers for the resources being used in that domain, and then link them to the corresponding first reliability network slice or the second reliability network slice to control the use of separate, independent components and/or network function in each domain.

At 504, the one or more UEs may be provided identifiers for the reliability network slices. For example, when the gNB 208A broadcasts the identifier for the first reliability network slice 260A and the gNB 208B broadcasts the second reliability network slice 260B, the UE 204A determines that gNB 208A serves the required first reliability network slice 260A, and determines that gNB 208B serves the required the second reliability network slice 260B.

At 506-508, the one or more UE requests registration to the at least two network reliability network slices. For example, UE 204A may register and establish a PDU session, at 506, with the network to access the first reliability network slice 260A at the gNB 208A, while UE 204B may register and establish a PDU session, at 508, with the network to access the second reliability network slice 260B at the gNB 208B.

In the case of dual connectivity as in FIG. 3, the UE 304 may register in the first reliability network slice and establish dual connectivity to the RAN based on the reliability network slice identifiers. For example, UE 304 may establish a connection to a master gNB 306A, which serves the first reliability network slice 360A, and UE 304 may establish a connection to a secondary gNB 306B, which serves the second reliability network slice 360B. The UE establishes separate PDU sessions in the first and second reliability slices. Once the sessions are set up, each of the reliability network slices can be used for carrying user plane and/or control plane traffic end-to-end at 512 and 514.

In some example embodiments, the M&O may provide a system for ensuring that resources, such as network functions, components, etc., in each of the network reliability slices have independent failure modes (e.g., with little if any sharing of resources between the slices). In some example embodiments, the M&O may use the tags (which identify each of the network reliability slices) to verify or control in each domain that the network reliability slices have independent failure modes. This enables the network reliability slices to have statistical orthogonality with respect to resources in each domain. In some example embodiments, the tags in each domain may be mapped to domain specific tags that have a different format. For example, the tag associated with a first reliability network slice may be mapped to a network slice identifier (NSI) per 3GPP TS 23.501) for the 5G core network domain, while the tag associated with the first reliability network slice may be mapped to a broadcast identifier in the RAN domain.

In some example embodiments, the reliability network slices may be used to provide high-reliability, end-to-end paths for ultra-reliable, low latency applications, such as IEEE TSN factory Ethernet LANS.

Figure 6:
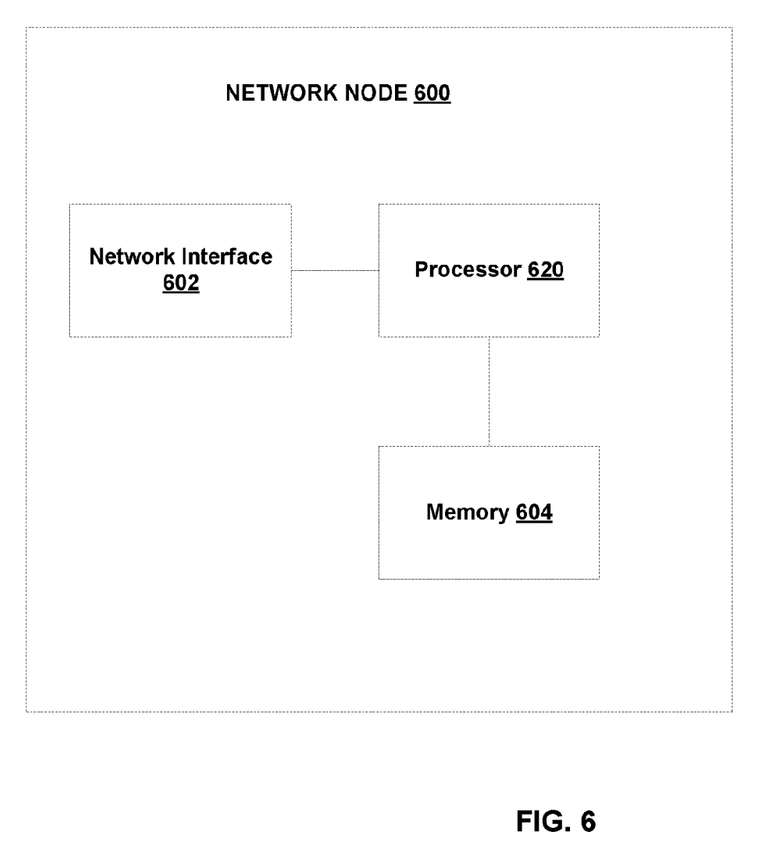
FIG. 6 depicts an example of a network node, in accordance with some exemplary embodiments.

FIG. 6 depicts a block diagram of a node 600, in accordance with some example embodiments. The network node 600 may be configured as a gNB base station, UPF, PCF, AMF, SMF, M&O, and/or any other node in for example FIGS. 1-5. Moreover, the physical resources associated with the network node may mapped to a given reliability network slice. The network node 600 may include a network interface 602, a processor 620, and a memory 604, in accordance with some example embodiments. The network interface 602 may couple to backhaul links and other nodes. These backhaul links may be wired and/or wireless. In the case of the gNB, it includes 5G radio access technology transceivers to provide a 5G radio access network. The memory 604 may comprise volatile and/or non-volatile memory including program code, which when executed by at least one processor 620 provides, among other things, the processes disclosed herein with respect to the base station.

The node 600 may also be implemented as a 5G node, such as a UPF, gNB, and/or other type of node as disclosed herein. The network node may receive, in a time sensitive communication path from a talker end station through at least a portion of a 5G system to a listener end station, a request including at least one quality of service parameter indicative of a scheduled gate time for transmission and/or reception at the 5G node on the time sensitive communication path. The network node may create a quality of service flow in accordance with the at least one quality of service parameter indicative of a scheduled gate time for transmission and/or reception at the 5G node on the time sensitive communication path.

Figure 7:
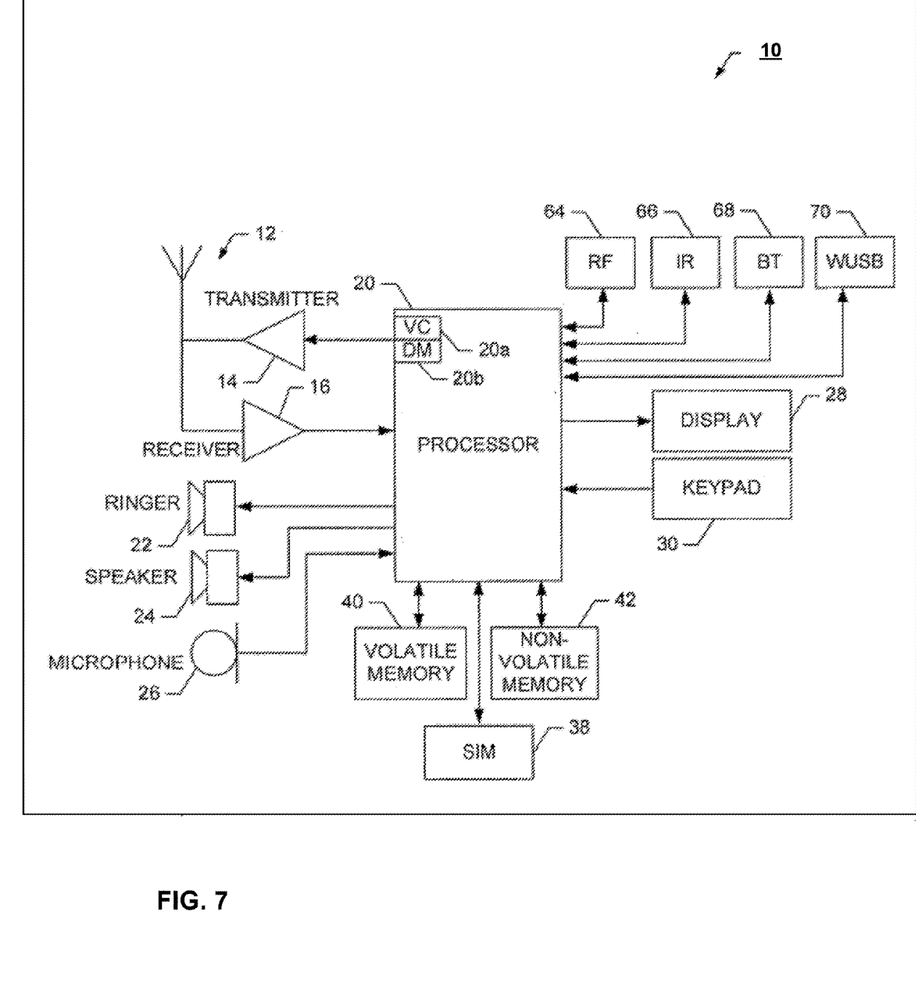
FIG. 7 depicts an example of an apparatus, in accordance with some exemplary embodiments.

FIG. 7 illustrates a block diagram of an apparatus 10, in accordance with some example embodiments. The apparatus 10 (or portions thereof) may be configured to provide an end station including cellular radio access technology. The user equipment may comprise or may be comprised in an end station. The end station including user equipment may be configured to transmit and receive (listener and talker), configured to only receive (e.g., listener), and/or configured to only transmit (talker). In some example embodiments, the end station also includes IEEE TSN circuitry to interface to a TSN Ethernet coupled to devices, such as robots, IoT devices, and/or other types of devices.

In some example embodiments, the UE may be configured to operate using network reliability slices. For example, the UE may be configured with network reliability slices tag or other similar identifier for the network reliability slices. When this is the case, the UE may couple to a first gNB base station based in part on the presence of the first network reliability slice, and couple to a second a second gNB base station based in part on the presence of the second network reliability slice. Moreover, the UE may establish PDU sessions over the first and second network reliability slice, and then duplicate packets for transmission over the reliability network slices or delete duplicate packets being received over the reliability network slices.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth generation (5G), Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE. For example, the apparatus 10 may be capable of operating in accordance with 5G wireless communication protocols, such as 3GPP NR, NG-RAN, and/or the like. Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 7, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 112 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to the end stations/user equipment. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the end station and/or UEs. For example, the apparatus may access a first network reliability slice served by a first base station; access a second network reliability slice served by a second base station, wherein the first network reliability slice and the second network reliability slice are established across domains such that one or more first resources providing the first network reliability slice are not shared with one or more second resources providing the second network reliability slice; establish a first packet data protocol session over the first network reliability slice and a second packet data protocol session over the second network reliability slice; and/or transmit user plane traffic over the first packet data protocol session on the first network reliability slice and duplicated user plane traffic over the second packet data protocol session on the second network reliability slice.

Some of the embodiments disclosed herein may be implemented in software, hardware, application logic, or a combination of software, hardware, and application logic. The software, application logic, and/or hardware may reside on memory 40, the control apparatus 20, or electronic components, for example.

In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 7, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is improved reliability of communications over the 5G system as well as other domains.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
    accessing, by a first user equipment of a device, a first network reliability slice served by a first base station;
    accessing, by a second user equipment of the device, a second network reliability slice served by a second base station, wherein the first network reliability slice and the second network reliability slice are established across domains, wherein one or more first resources providing the first network reliability slice are not shared with one or more second resources providing the second network reliability slice;
    establishing, via the first user equipment, a first packet data protocol session over the first network reliability slice;
    establishing, via the second user equipment, a second packet data protocol session over the second network reliability slice;
    transmitting, by the first user equipment, to a data network, user plane traffic over the first packet data protocol session on the first network reliability slice; and
    transmitting, by the second user equipment, to the data network, the user plane traffic over the second packet data protocol session on the second network reliability slice.

2. The method of claim 1, wherein the first network reliability slice is identified by a first tag that is mapped to one or more domain specific identifiers indicating the one or more first resources used in the domains for the first network reliability slice, and the second network reliability slice is identified by a second tag that is mapped to one or more domain specific identifiers indicating the one or more second resources used the domains for the second network reliability slice.

3. The method of claim 2, wherein the one or more domain specific identifiers are at least one of the following: a single network slice selection assistance information, a subnetwork identifier, a dedicated reliability tag, a private network identifier, or a frequency band.

4. The method of claim 1, wherein the first network reliability slice and the second network reliability slice are configured by a management and orchestration function to minimize common physical resource usage between the first network reliability slice and the second network reliability slice.

5. The method of claim 1, further comprising:
receiving, by the first user equipment, a first tag indicating the first network reliability slice is served by the first base station, wherein the first tag is received via a broadcast from the first base station; and
receiving, by the second user equipment, a second tag indicating the second network reliability slice is served by the second base station, wherein the second tag is received via a broadcast from the second base station.

6. The method of claim 1, wherein the device is in dual connectivity with the first network reliability slice served by the first base station and the second network reliability slice served by the second base station.

7. An apparatus comprising:
at least one processor; and
at least one memory including computer program code, the at least one memory and the computer program code configured to, with the at least one processor, cause the apparatus to at least:
access, via a first user equipment of the apparatus, a first network reliability slice served by a first base station;
access, via a second user equipment of the apparatus, a second network reliability slice served by a second base station, wherein the first network reliability slice and the second network reliability slice are established across domains, wherein one or more first resources providing the first network reliability slice are not shared with one or more second resources providing the second network reliability slice;
establish, via the first user equipment, a first packet data protocol session over the first network reliability slice;
establish, via the second user equipment, a second packet data protocol session over the second network reliability slice;
transmit, via the first user equipment, to a data network, user plane traffic over the first packet data protocol session on the first network reliability slice; and
transmit, via the second user equipment, to the data network, the user plane traffic over the second packet data protocol session on the second network reliability slice.

8. The apparatus of claim 7, wherein the one or more first resources and the one or more second resources each include components and/or network functions.

9. The apparatus of claim 7, wherein the domains include a radio access network domain, a backhaul transport network domain, and a core network domain.

10. The apparatus of claim 9, wherein the first network reliability slice and the second network reliability slice do not share resources in any of the domains.

11. The apparatus of claim 9, wherein the first network reliability slice and the second network reliability slice minimize shared resources in one or more of the domains.

12. The apparatus of claim 7, wherein the first network reliability slice is identified by a first tag that is mapped to one or more domain specific identifiers indicating the one or more first resources used in the domains for the first network reliability slice, and the second network reliability slice is identified by a second tag that is mapped to one or more domain specific identifiers indicating the one or more second resources used in the domains for the second network reliability slice.

13. The apparatus of claim 12, wherein the one or more domain specific identifiers are at least one of the following: a single network slice selection assistance information, a subnetwork identifier, a dedicated reliability tag, a private network identifier, or a frequency band.

14. The apparatus of claim 7, wherein the first network reliability slice and the second network reliability slice are configured by a management and orchestration function to minimize common physical resource usage between the first network reliability slice and the second network reliability slice.

15. The apparatus of claim 7, wherein the apparatus is further caused to at least:
receive a first tag indicating the first network reliability slice is served by the first base station, wherein the first tag is received via a broadcast from the first base station; and
receive a second tag indicating the second network reliability slice is served by the second base station, wherein the second tag is received via a broadcast from the second base station.

16. The apparatus of claim 7, wherein the apparatus is in dual connectivity with the first network reliability slice served by the first base station and the second network reliability slice served by the second base station.

17. The apparatus of claim 7, wherein the apparatus further includes interface circuitry to a time sensitive network.

18. A non-transitory computer readable storage medium including program code which when executed causes operations comprising:
accessing, by a first user equipment of a device, a first network reliability slice served by a first base station;
accessing, by a second user equipment of the device, a second network reliability slice served by a second base station, wherein the first network reliability slice and the second network reliability slice are established across domains, wherein one or more first resources providing the first network reliability slice are not shared with one or more second resources providing the second network reliability slice;
establishing, via the first user equipment, a first packet data protocol session over the first network reliability slice;
establishing, via the second user equipment, a second packet data protocol session over the second network reliability slice;

transmitting, by the first user equipment, to a data network, user plane traffic over the first packet data protocol session on the first network reliability slice; and transmitting, by the second user equipment, to the data network, the user plane traffic over the second packet data protocol session on the second network reliability slice.

19. The method of claim 1, wherein the one or more first resources providing the first network reliability slice comprise a first gNB and a first set of one or more core network functions, and wherein the one or more second resources providing the second network reliability slice comprise a second gNB a second set of one or more core network functions.

20. The method of claim 1, wherein the domains comprise a radio access network domain, a backhaul transport network domain, and a core network domain.

21. The apparatus of claim 7, wherein the one or more first resources providing the first network reliability slice comprise a first gNB and a first set of one or more core network functions, and wherein the one or more second resources providing the second network reliability slice comprise a second gNB a second set of one or more core network functions.

22. The apparatus of claim 7, wherein the domains comprise a radio access network domain, a backhaul transport network domain, and a core network domain.

* * * * *